UNITED STATES PATENT OFFICE 2,191,059

CARBONACEOUS ION-EXCHANGE MATERIAL

Otto Liebknecht, Neubabelsberg, near Berlin, Germany, assignor to The Permutit Company, New York, N. Y., a corporation of Delaware No Drawing. Application September 23, 1938, Serial No. 231,449. In Germany April 13, 1934

13 Claims. (Cl. 252—2)

This invention or discovery relates to carbonaceous ion-exchange zeolites; and it comprises as a new composition for treating water, a granulated black material, usually between 10 and 40 mesh size, resembling granulated coal in its physical appearance, containing at least 4 per cent $SO_3$ in organic combination released only under long extended hydrolytic extraction, giving no sensible acidity to pure water, being capable of abstracting bases from flowing water, irrespective of the nature of their saline combination, in amounts calculated as $CaCO_3$ well above 0.5 pound per cubic foot of granular substance, being durable under an indefinite number of alternating treatments of flowing water and of regeneration by flows of dilute strong acid, not changing in exchange activity after long periods of use with loss of $SO_3$; said composition being the product of reaction of granulated humic material of the nature of wood, peat, lignite, coals and cokes with $SO_3$ vapors; all as more fully hereinafter set forth and as claimed.

In a prior, copending application, Ser. No. 10,127, filed March 8, 1935, I have disclosed and claimed processes of making improved zeolites by sulfating treatments of humic carbonaceous substances and various methods of using such carbonaceous zeolites for abstracting the bases of salts dissolved in water, as in hard water or softened water, and for exchanging such bases for other bases. In the manufacture of sulfated humic zeolites, as described in said copending application, a member of the coal group of minerals containing humic matter, such as lignite or bituminous coal, is granulated and treated with an ample amount of a strong sulfuric acid reagent, $H_2SO_4$, the fuming acid, pyrosulfuric acid, the anhydride $SO_3$ etc. In the treatment the hydrocarbons of the coal are oxidized and sulfated, forming insoluble sulfonic acids and sulfuric acid esters with evolution of $SO_2$. The temperature of the reacting mass rises and when the sulfating action ceases and excess acid is removed, the washed product is a rugged, granular hydrogen zeolite of high exchange value, highly useful in base abstraction with acid regeneration and also in base exchange with salt regeneration.

Pervious beds of these granular acidic zeolites are durable under repeated use and regeneration as in a zeolite water softener of the well known type. Such beds are particularly resistant to repeated alternate flows of water containing carbonate alkalinity and dilute strong acid for regeneration. The ruggedness and durability of the sulfated humic zeolites and their high exchange capacity have led to great improvement in the technique of water softening in particular and of metathetical exchange processes in general.

I have found that the reaction product of bituminous coal of high volatile content, or similar humic material, lignite, anthracite, etc. and gaseous $SO_3$ forms an ion-exchange zeolite having in marked degree the desired combination of ruggedness and durability with great exchange capacity. A sulfated humic zeolite of high capacity for softening water results from passing $SO_3$ vapors into contact with granular bituminous coal and subsequently washing with water. A given quantity of coal reacts with $SO_3$ in quantity several times the weight of the coal and when the reaction is complete, removal of excess acid leaves a sulfated product having the desired properties in superlative degree. During the reaction, $SO_2$ is evolved and the coal absorbs a great excess of $SO_3$, which is subsequently washed out with water as a sulfuric acid solution. After the washing, the product is ready for use as an ion exchanger in treating water either to abstract the bases of dissolved salts, leaving the water acid, or, after the sulfated product is charged with sodium base, to soften water by base exchange. The granular product made by sulfation of bituminous coal, as described, has an operating exchange value of the order of 10 to 11 kilograins of hardness expressed as $CaCO_3$ per cubic foot when regenerated with about 4 pounds salt per cubic foot; that is to say, it can be depended upon to take up from flowing water bases in amounts equivalent to 1.5 pounds or more $CaCO_3$ per cubic foot of the granular sulfated product, this being a salt efficiency about 44 per cent of theoretical.

Granular humic materials treated with $SO_3$ may be converted to strong zeolites having an exchange capacity less than the maximum by using less $SO_3$ and a shorter time in the sulfating treatment. However, the smaller exchange capacity, which may be desirable for some purposes, does not materially lower the regenerating efficiency in metathetical ion exchange. In the manufacture, the sulfur content and exchange value of the product is regulated by the relative quantity of $SO_3$ used in the treatment.

In producing the reaction product of bituminous coal with gaseous $SO_3$, it is advantageous to granulate the coal to a size somewhat larger than the size of granules desired in the product. This granulated coal is placed in a suitable vessel and sulfuric anhydride vapor from a convenient source and advantageously diluted with air, is passed into contact with the granulated coal. Coal has, as I have found, the power of taking up from the gases an amount of SO₃ several times the weight of the coal. And the sulfating reaction proceeds with evolution of heat and some disintegration of the coal granules. The temperature should not be allowed to rise above 30° C. It is usually advantageous to cool the vessel so as to hold the temperature of reaction below 100° C. The reaction requires several hours' time, and the exchange value and sulfur content of the sulfated material increase as the reaction proceeds to completion. The material then is washed and the excess SO₃ which has been taken up is removed as sulfuric acid. The washed fully sulfated product usually has a sulfur content equivalent of 10 to 20 per cent SO₃ on a dry basis and an exchange value above 11,000 grains. An exchange value one half of this may be associated with a sulfur content of 4 to 6 per cent SO₃. In the sulfating reaction, which is a vigorous one, the coal is disintegrated to some extent and, as above stated, it is usually advantageous to have the granules of raw coal before treatment considerably larger than the granule desired. For example, if the raw coal is sized to pass a 10-mesh screen and to be held on a 20-mesh screen, then the product of the SO₃ treatment will be for the most part held on a 40-mesh screen; the losses in fines being thus minimized. A 10-40 mesh size of sulfated granule is convenient and advantageous. Thus the fineness of the product is controlled as desired by the sizing of the raw coal.

In a specific example of the invention, four cubic feet of granulated bituminous coal containing 30 per cent volatile matter and weighing 160 pounds with less than 2 per cent moisture were placed in a lead-lined rotary drum equipped with flights for agitating purposes and SO₃ vapor, from a liquid container under pressure, and diluted with dry air to a concentration of 10 to 15 per cent SO₃ by volume was passed into the drum for about 20 hours; the revolving drum being sprayed with water to keep the temperature below 100° C. The effluent gases containing considerable amounts of SO₂ and negligibly small quantities of SO₃ were scrubbed with water. In the reaction a total of about 600 pounds SO₃ was used. The coal swelled in volume from 4 to 8 cubic feet and increased in weight from 160 to 440 pounds. The coal took up 3.6 pounds SO₃ per pound coal, the sulfated coal, before washing, containing 58 per cent SO₃. After the sulfating reaction was complete, the product was sprayed with water and about 500 pounds of 40 per cent sulfuric acid drained from the sulfated coal. The product was then washed thoroughly with water until it no longer gave up acidity. The washed and drained product containing 43 per cent moisture weighed 250 pounds. It contained 15 per cent SO₃ on a dry basis and showed by test an operating exchange value of 11,300 grains CaCO₃ per cubic foot under regeneration with 4 pounds NaCl. Samples of material taken from the revolving drum during the sulfating operation showed a gradual increase of SO₃ content and of exchange value. For example, about midway of the total time, when the weight of acid anhydride used was about half the total, the SO₃ content (before washing) was 28 per cent, after washing about 7 per cent and the exchange value (after washing) was 7400 grains with 4 pounds salt per cubic foot.

In the sulfating, as described, in a rotating drum, the temperature at the gas intake end was considerably higher than that at the exit until the reaction was nearly complete. It is possible to utilize the countercurrent principle by passing the coal through a long revolving drum in one direction and diluted SO₃ gas in the opposite direction through the drum. So doing, the temperature is equalized and consumption of SO₃ greatly reduced.

It has been found that the substantially water insoluble, granular washed product of the reaction between bituminous coal and SO₃ vapors is distinguished by its high exchange activity and great durability in use. The product can be used for an indefinitely long time as a pervious bed in a water softener without signs of physical deterioration or loss of chemical activity. However, in continued use for treatment of flowing water with occasional regenerating flows of dilute acid or of salt brine, there is a gradual loss of sulfur content without loss of exchange activity.

This application is a continuation-in-part of my application Serial No. 10,127, filed March 8, 1935.

What I claim is:

1. As a new manufacture for use in treating water by ion-exchange, a reaction product of gaseous SO₃ and a carbonaceous material selected from the group consisting of wood, peat, lignite, coals and cokes, in durable granules containing sulfur equivalent to at least 10 per cent SO₃.

2. An ion-exchange material consisting of a granular product obtained by treating granular carbonaceous material selected from the group consisting of wood, peat, lignite, coals and cokes with gaseous SO₃, said product being durable granules of sulfur containing water insoluble carbonaceous material.

3. A product according to claim 2 in the form of granules passing through a screen having 10 meshes to the linear inch and held by a 40 mesh screen.

4. An ion-exchange material according to claim 2 in which the sulfur content calculated as SO₃ is from 10 to 20 per cent.

5. An ion-exchange material according to claim 2 having an operating exchange value above 10,000 grains CaCO₃ equivalent per cubic foot when regenerated with 4 pounds salt.

6. A process of making an ion-exchange material which comprises passing vapors of SO₃ in contact with granules of a carbonaceous material selected from the group consisting of wood, peat, lignite, coals and cokes, preferably at temperatures under 100° C.

7. A process of making an ion-exchange material which comprises reacting granules of a carbonaceous material selected from the group consisting of wood, peat, lignite, coals and cokes with SO₃ vapors until the material has taken up a substantial quantity of excess SO₃, and washing out excess SO₃ with water as sulfuric acid.

8. A process of making an acid resistant water insoluble granular ion-exchanging material comprising reacting granules of a carbonaceous material selected from the group consisting of wood, peat, lignite, coals and cokes having a relatively high content of volatile matter with sufficient gaseous SO₃ to produce a sulfated high sulfur containing reaction product having a high capacity for ion-exchange, and thereafter washing the product to remove soluble matter.

9. A process as defined in claim 8 in which the carbonaceous material is reacted with more than an equal weight of gaseous $SO_3$.

10. A process as defined in claim 8 in which the carbonaceous material is granulated to a size such that a major portion of it is retained on a 20 mesh screen before being reacted with the gaseous $SO_3$.

11. A process as defined in claim 8 in which the gaseous $SO_3$ is diluted with another gas to control the rate of reaction of the $SO_3$ with the coal.

12. A process as defined in claim 8 in which the carbonaceous material being reacted with the gaseous $SO_3$ is cooled during the reaction.

13. A process of preparing carbonaceous ion exchange material in the form of durable granules for conditioning water by cation exchange comprising passing a stream of diluted $SO_3$ gas into contact with coarsely granulated carbonaceous material selected from the group consisting of wood, peat, lignite, coals and cokes for several hours while maintaining the temperature of the reaction therebetween below about 100° C., and thereafter washing soluble matter out of the granular reaction product.

OTTO LIEBKNECHT.

---

CERTIFICATE OF CORRECTION.

Patent No. 2,191,059. February 20, 1940.

OTTO LIEBKNECHT.

It is hereby certified that error appears in the printed specification of the above numbered patent requiring correction as follows: Page 2, second column, line 72, claim 8, strike out the word "sulfated"; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.

CERTIFICATE OF CORRECTION.

Patent No. 2,191,059.　　　　　　　　　　　　　　　February 20, 1940.

OTTO LIEBKNECHT.

It is hereby certified that error appears in the printed specification of the above numbered patent requiring correction as follows: Page 2, second column, line 72, claim 8, strike out the word "sulfated"; and that the said Letters Patent should be read with this correction therein that the same may conform to the record of the case in the Patent Office.

Signed and sealed this 9th day of April, A. D. 1940.

(Seal)

Henry Van Arsdale,
Acting Commissioner of Patents.